Sept. 10, 1968   J. H. AMMON ET AL   3,401,082
INTEGRAL STEAM GENERATOR AND NUCLEAR REACTOR COMBINATION
Filed May 24, 1966                                                5 Sheets-Sheet 5

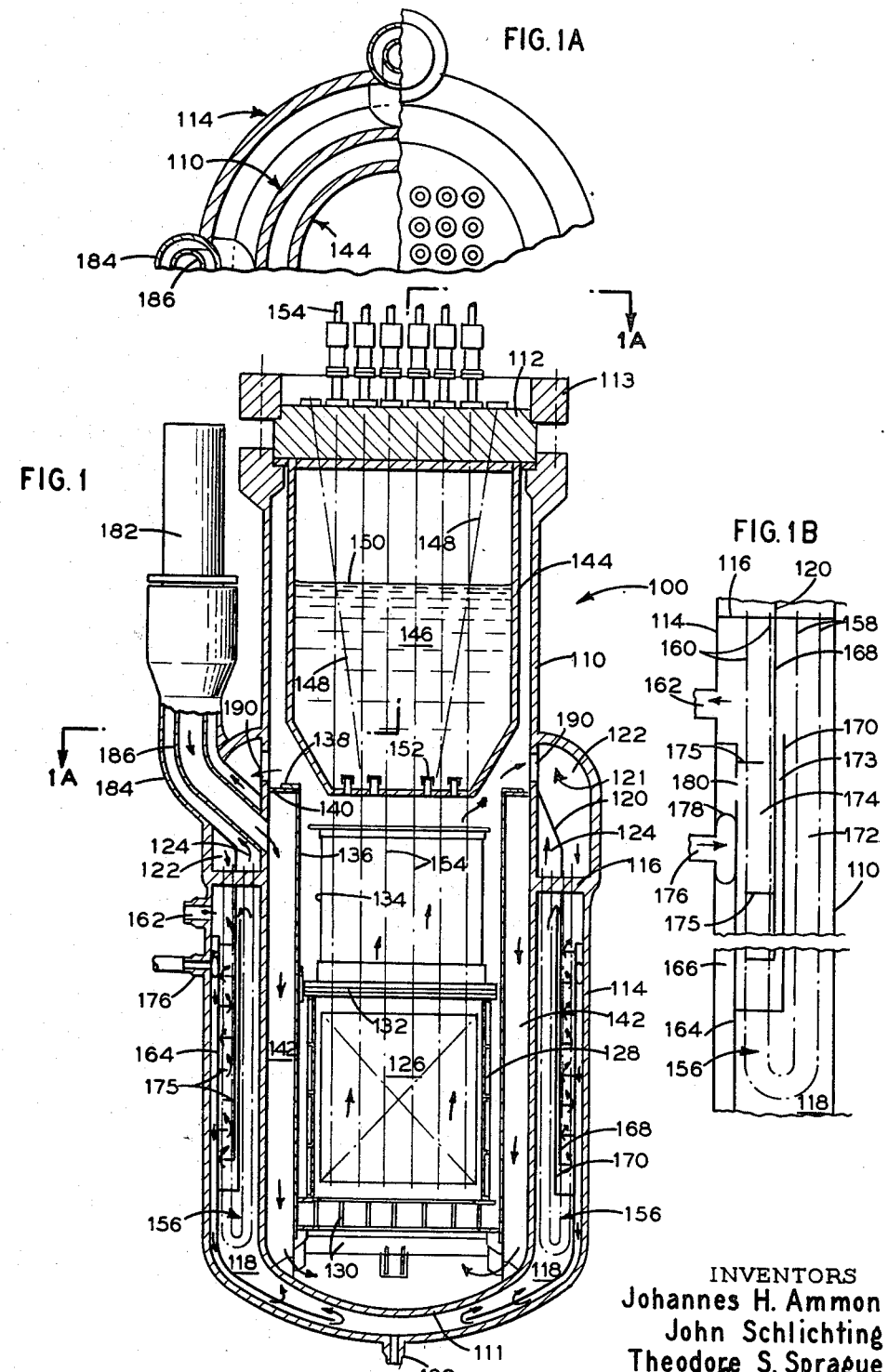

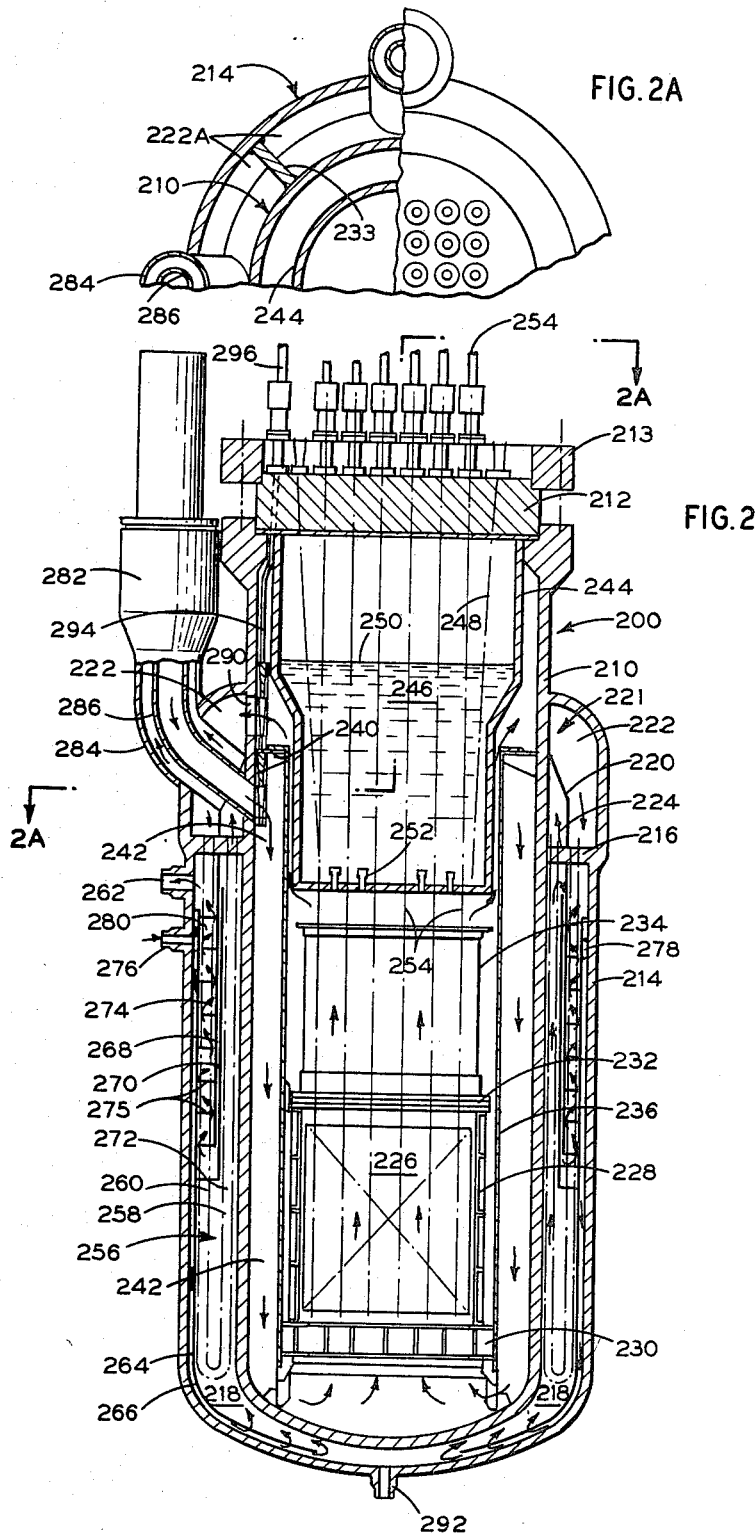

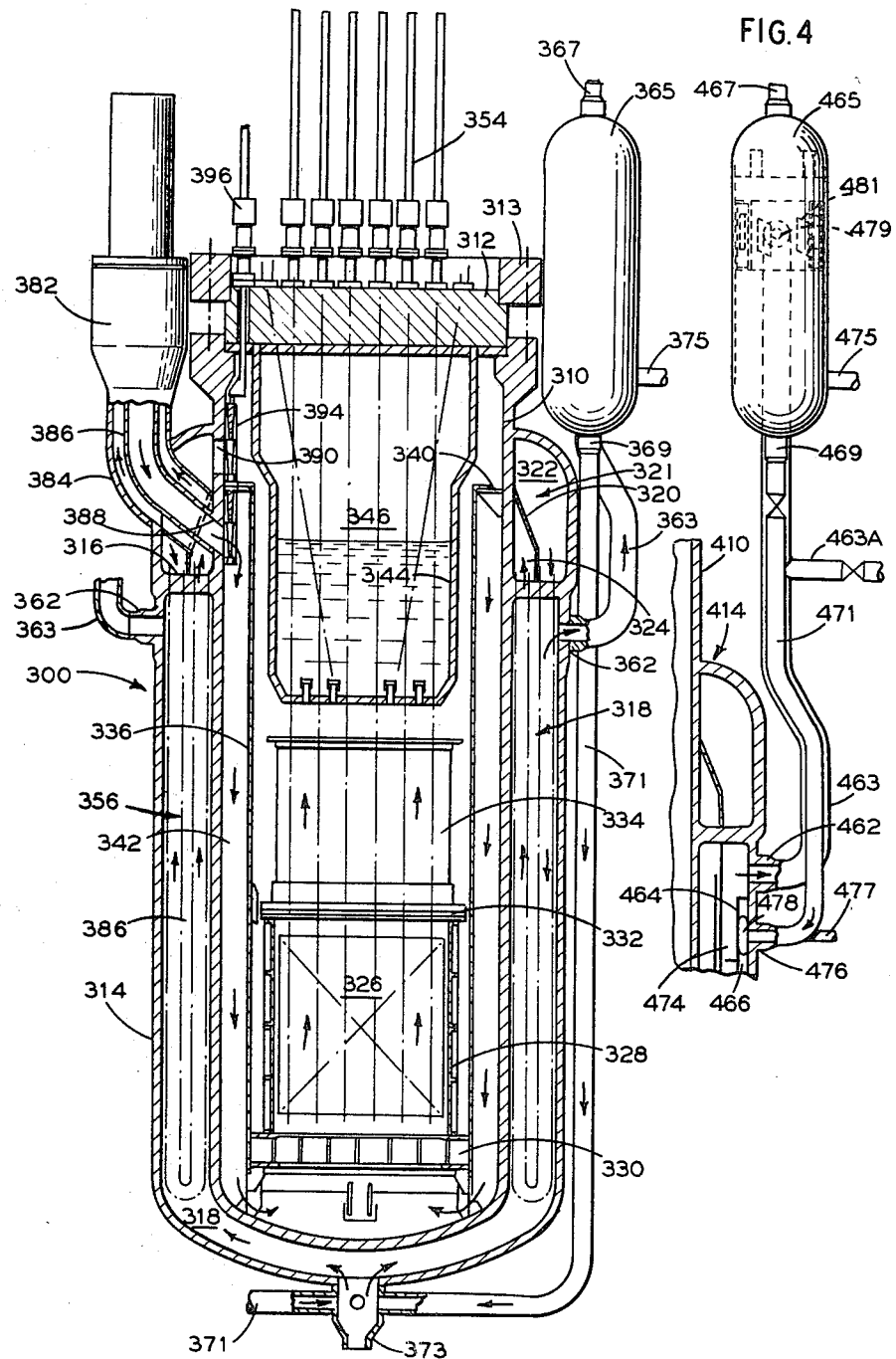

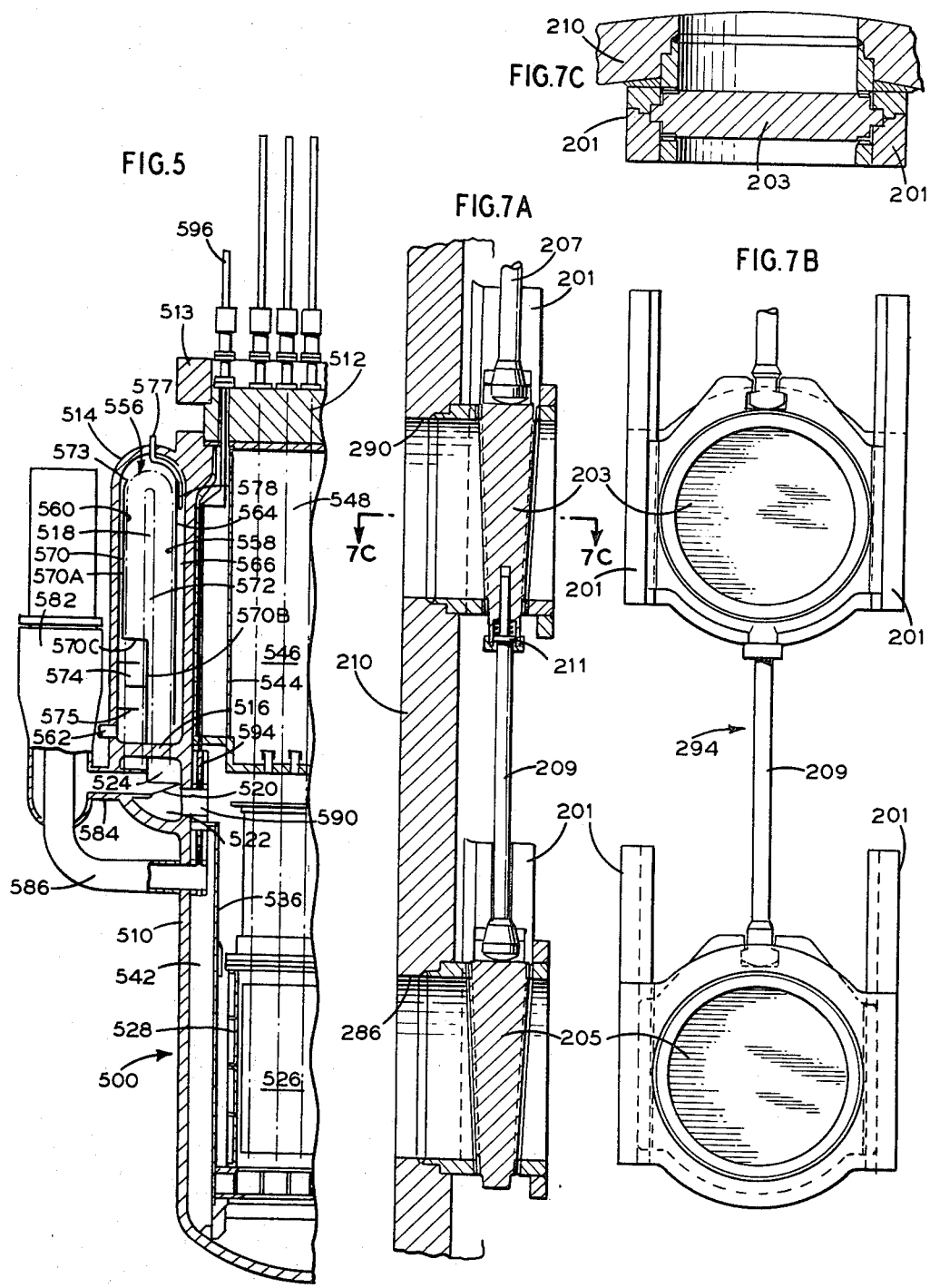

INVENTOR.

BY though the second pressure vessel and over the tubes in
indirect heat absorbing relation with the primary fluid.
Special provisions are made for preheating the secondary
fluid as it enters the second pressure vessel; for the production
of superheated or saturated vapor by once-through
flow of secondary fluid or of saturated vapor by natural
circulation of secondary fluid; and for emergency operation
in the event of tube leak.

The various features of novelty which characterize the
invention are pointed out with particularity in the claims
annexed to and forming a part of this specification. For
an understanding of the invention, its operating advantages
and specific objects attained by its use, reference should
be had to the accompanying drawing and descriptive matter
in which there is illustrated and described a preferred
embodiment of the invention.

In the drawings:

FIG. 1 is a vertical section of a first embodiment of
the present invention;

FIG. 1A is a partial plan section taken along the line
1A—1A of FIG. 1;

FIG. 1B is an enlarged diagrammatic view of a portion
of FIG. 1;

FIG. 2 is a vertical section of a second embodiment of
the invention;

FIG. 2A is a partial plan section taken along the line
2A—2A of FIG. 2;

FIG. 3 is a vertical section of a third embodiment of
the invention;

FIG. 4 is a partial vertical section of a fourth embodiment
of the invention;

FIG. 5 is a partial vertical section of a fifth embodiment
of the invention;

FIGS. 7A, 7B and 7C are enlarged details of the tandem
gate valve construction of FIGS. 2, 3 and 5.

Similar elements in the various figures bear the same
base reference numeral with the addition of a prefix numeral
for distinguishing between the several embodiments.

Figure 6:
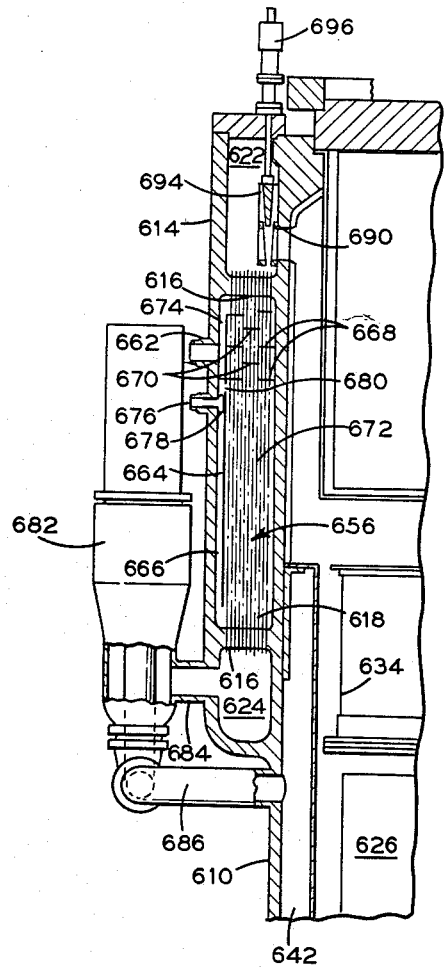
FIG. 6 is a partial vertical section of a sixth embodiment
of the invention.

FIGURE 1 shows a unitary steam generator-nuclear reactor
unit 100 comprising a vertically extending cylindrical
pressure vessel 110 closed at its upper end by a circular
flat closure member 112 and at its lower end by an integrally
formed head 111, with member 112 being secured
in place by a ring-type flange 113 bolted to vessel 110.
The lower two-thirds of vessel 110 is enclosed by wall
structure spaced from and of substantially the same configuration
as the lower portion of vessel 110 and cooperating
with vessel 110 to form a second vessel 114 of generally
annular form. Vessel 114 has its upper end connected
to vessel 110 and cooperates with vessel 110 and a horizontally
extending annular plate 116 to provide a lower
compartment 118 and an upper compartment 121, with
the latter being divided by a fluid tight partition 120 into
chambers 122 and 124.

The lower portion of vessel 110 is occupied by a nuclear
reactor core 126 supported between lower and upper
grid support structures 130 and 132, respectively, and
surrounded by a vertically arranged cylindrical shroud
128 forming a flow passage for primary fluid. A cylindrical
member 134 is positioned above core 126 and provides
a continuation of the flow passage formed by shroud 128.

A vertically arranged cylindrical shell 136 is positioned
in vessel 110 superjacent head 111 and intermediate
shroud 128 and the wall structure of vessel 110; is open
at its upper and lower ends and supported by grid 130;
has its upper end formed with an outwardly extending
annular flange 138 suitably secured to a horizontal annular
plate member 140 connected to the inner face of
vessel 110 at a position superjacent member 134; and cooperates with vessel 110 and member 140 to provide a flow passage 142.

The upper part of vessel 110 is occupied by a container 144 of circular cross-section secured to the inner face of closure member 112 and extending downwardly therefrom to about the level of plate member 140. Container 144 forms a pressurizing space 146 and is equipped with electric heating elements 148 for vaporizing and pressurizing the reactor primary fluid which is shown standing at a level 150 in the container. A multiplicity of hooded conduits 152 extend through the bottom of container 144 to provide primary fluid passageways between space 146 and the core portion of vessel 110. Mounted on top of closure member 112 are a number of control rod drive assemblies 154 which extend downwardly through member 112 and space 146 into core 126 to provide means for controlling the fission reaction.

Compartment 118 is occupied by an annular bank of vertically extending U-shaped tubes 156 arranged in an equilateral triangular lattice. For a complete disclosure of tubes so disposed reference is made to U.S. Patent No. 3,360,060. Tubes 156 have their opposite ends fitted into openings in plate 116 and include inlet legs 160 opening into chamber 122 and outlet legs 158 opening into chamber 124.

With reference to FIGS. 1 and 1B, compartment 118 is subdivided by upright annular partitions or baffles 164, 168 and 170. Partition 164 is positioned intermediate the outer wall of vessel 114 and tube legs 160 and has its upper end formed with a horizontal flange connected to vessel 114 at a position subjacent plate 116 and its lower portion extending along a part of head 111. Baffles 168 and 170 are located intermediate tube legs 160 and 158, with baffle 170 having its lower end formed with a horizontal annular flange secured to partition 164 at a point just above the looped portions of tubes 156 and extending upwardly to a position subjacent plate 116, and with baffle 168 having its upper end connected to plate 116 and extending downwardly to a point superjacent the flanged portion of baffle 170. Thus partition 164 cooperates with vessel 114 to provide a flow passage 166 and with partition 168 and plate 116 to provide a flow passage 174, while baffle 170 cooperate with vessel 110 to provide flow passage 172 and with baffle 168 to form flow passage 173. Flow passage 174 is further subdivided by horizontal annular partitions 175 alternately extending from partitions 164 and 168 to cause sinuous flow of fluid in flow passage 174 and over the tube legs 160 disposed therein.

The circumferential wall of vessel 114 is provided with a nozzle 162 opening into passage 174 at a position between plate 116 and the flanged portion of baffle 164 and with a nozzle 176 extending into the upper end of space 166 and connected to a horizontal ring-shaped fluid distribution header 178. Above header 178 baffle 164 is formed with openings 180 to provide communication between space 166 and 174. The bottom of vessel 114 is fitted with a drain nozzle 192 opening into compartment 118.

Circulating pumps 182 are mounted outside and at the upper end of vessel 110, each pump having spaced concentrically arranged inlet and outlet conduits 184 and 186. Each conduit 184 is connected to vessel 114 and opens into compartment 124, while each conduit 186 is connected to vessel 110 and opens into the upper part of space 142. Vessel 110 is formed with openings 190 to permit flow of primary fluid from shell 136 to compartment 122.

In operation the pressurized primary fluid, after removing heat generated by the fission reaction in core 126, flows upwardly through extension 134 and openings 190 to inlet compartment 122, then passes successively through tubes 156, outlet compartment 124 and conduits 184 to pumps 182, and then is directed through outlet conduits 186 and flow passage 142 back to core 126 to complete the cycle. In the FIG. 1 embodiment, as well as those described below, pumps 182 receive the primary fluid after it has been cooled by indirect heat exchange with the secondary fluid, thus preventing flashing and cavitation in the pumps.

Secondary fluid, preferably water at a pressure greater than atmospheric pressure and substantially less than that of the primary fluid, supplied by a pump, not shown, passes through nozzle 176, distribution header 178 and flow passage 166, then successively flows through flow passages 172, 173, and 174 to nozzle 162 while passing over and between the tubes of tube bank 156 in indirect heat absorbing relation with the primary fluid flowing through such tubes. The fluid heating surfaces of the tube bank are proportioned and arranged so that the heat absorbing medium flowing over and between the tubes is substantially completely vaporized upon reaching flow passage 174 and then superheated as it winds through flow passage 174 and over the tube portions disposed therein. A portion of the superheated vapor flowing in passage 174 is by-passed through openings 180 in the upper portion of baffle 164 to flow passage 166 for mixing with and preheating the fluid entering passage 166. For a more complete description of this system of vapor generation, including the provisions for preheating the feed fluid, refer to U.S. application Ser. No. 426,035.

The primary coolant in container 144 is pressurized. Conduits 152 of the container provide communication between space 146 and the remaining interior of vessel 110 to maintain the pressure of the primary fluid and to compensate for any surge of primary coolant from the core or for loss of primary fluid volume within the core which may occur during operation of the reactor.

The modified unit of FIGS 2 and 2A is generally of the same construction as that of FIG. 1, except vessel 214 encloses all but the upper quarter of vessel 210; shell 236 surrounds the lower portion of container 244, as well as cylindrical member 234 and core 226; tubes 256 are of greater length owing to the upward extension of vessel 214; inlet chamber 222 is divided into four compartments 222A by partitions 233, each compartment receiving primary fluid from shell 236 through a corresponding opening 290 formed in vessel 210, each opening 290 being in vertical alignment with the outlet end of a primary fluid supply conduit 286; and valves 294 are provided for cutting off flow of primary fluid from shell 236 to compartments 222A and from conduits 286 to flow passage 242 and are connected to control elements 296 for positioning the valves. The flow paths of the primary and secondary fluids are the same as those described in FIG. 1.

The gate valve-primary fluid distribution chamber construction of FIG. 2 permits isolation of any one of the compartments 222A, and thereby the tubes supplied by such compartment, in the event of a tube leak or failure. FIGS. 7A, 7B and 7C show details of gate valves 294. Each valve is mounted in guides 201 connected to the inside face of vessel 210; and comprises upper and lower valve disks 203 and 205, respectively. Disk 203 has its upper end connected to a control rod 207, which is associated with a control element 296, and its lower end connected to disk 205 by a rod 209 provided with a spring assembly 211 in the bottom of disk 203 adapted to prevent seating of disk 203 until disk 205 is in place. The valve guides and disks are tapered to provide a fluid tight fit. Disks 203 and 205 are adapted to concurrently cut off flow in paired vertically aligned flow passages 290 and 286. In the event of a tube leak occurring at a tube-to-tube sheet attachment, the section of the tube bank containing the failed tube can be detected by the increased radiation in its superheated outlet vapor. Once the failed tube is located, it is isolated from the primary fluid flow system by closing the associated gate valve 294 which seals corresponding paired passages 290 and 286. When primary fluid flow to the compartment 222A supplying the failed tube is so interrupted, pressure in this compartment slowly decreases to the pressure of the secondary fluid, with the result that no additional radioactive fluid will mix with the secondary fluid and the outflow from nozzles 262 will be free of radioactive particles. Thus the unit can be operated at reduced power until opportunity for repair of the failed tube arises.

While the units of FIGS. 1 and 2 are constructed and arranged for once-through flow of the secondary fluid to provide superheated vapor at outlet nozzles 162 and 262, respectively, the embodiment of FIG. 3 is adapted for natural circulation of the secondary fluid and to provide saturated vapor at the vapor generating section outlet. The modified unit of FIG. 3 is essentially of the same construction as that of FIG. 2 except that compartment 318 is not partitioned by baffles; and nozzles 362 are connected by conduits 363 for supply of fluid to drum 365, only one of which is shown. Each drum 365 has a water level separating an upper vapor space from a lower water space, contains vapor-liquid separating equipment (not shown), is supplied with feedwater by a conduit 375, and is provided with a vapor outlet 367 at its top and liquid outlet 369 at its bottom connected by conduit 371 for flow to a fitting 373 secured to vessel 314 and opening into compartment 318. Tube bank 356 is proportioned and arranged so that the secondary fluid flowing over and between the tubes is almost wholly vaporized when it reaches nozzles 362. In operation, secondary fluid supplied by a pump, not shown, passes in parallel flow relation through conduits 375 to drums 365, then flows through conduits 371 to compartment 318 for upward flow over the tubes of tube bank 356 in indirect heat absorbing relation with the primary fluid flowing therethrough, then passes in parallel through riser tubes 363 to the vapor spaces of drums 365 wherein it is directed through separators to remove entrained moisture from the vapor. Separated vapor passes upwardly for flow through outlet 367 of each drum to a point of use, while separated water flows downwardly to the water space of the drum for return to conduits 371.

FIGURE 4 illustrates a modification of the unit of FIG. 1 wherein drums of the character described in FIG. 3 are provided. Each drum 465 contains separator equipment 481, is connected for flow of fluid from nozzle 462 by conduit 463 and for flow of fluid to nozzle 476 by valve-controlled conduit 471, and is provided with a valve-controlled spray nozzle 479 and a valve-controlled feed conduit 475. A valve controlled drum by-pass 463A leads from each conduit 463. Vessel 414 is provided with a conduit 477 connected to header 478 for the supply of secondary fluid to flow passage 466. In all other respects the embodiment of FIG. 4 is substantially the same as that of FIG. 1. During normal operation, the primary and secondary fluid flow paths are the same as those described above for FIG. 1, with secondary fluid supply from conduit 477, flow to and from the drums cut off by suitable valves, and valves of conduits 463A opened so that secondary fluid outflow from tube bank 356 is directed in parallel through conduits 463 and 463A to point of use. Drums 465 are provided for emergency operation in the event of a tube leak to prevent radioactive particles from being carried by vapor to the prime mover. In such an emergency load is immediately reduced and valves controlling flow to and from drums 465 are opened while valves of conduits 463A are closed so that vapor generating section outflow is directed into drums 465 in contact with spray from conduits 479 for washing of radioactive particles from the vapor stream, and then passed through separator equipment, with separated vapor passing through outlets 467 and separated water, containing the radioactive particles, flowing to conduits 471.

While the components of the FIG. 5 embodiment are generally of the same character as those provided in the FIG. 2 construction, the disposition of some of the components has been altered. In FIG. 5 core 526 and its supports, shroud 528 and its extension, container 544, closure member 512 and its retaining member, and heating elements 548 occupy substantially the same positions relative to vessel 510 as do their counterparts in FIG. 2. By way of modification, the upper portion of vessel 510 is enclosed by vessel 514 having its upper and lower ends connected to the circumferential wall of vessel 510 and cooperating with vessel 510 and a horizontal annular plate 516 to form a lower compartment 521 and upper compartment 518, the former being divided by partitions 520 into chambers 522 and 524. Compartment 518 is occupied by an annular bank of upright inverted U-shaped tubes 556 having their opposite ends fitted into openings in plate 516 and comprising inlet legs 560 opening into chamber 522 and outlet legs 558 opening into chamber 524. Compartment 518 is subdivided by upright annular partitions 564 and 570. Partition 564 is located between the circumferential wall of vessel 510 and tube legs 558 and has its opposite ends spaced from the corresponding ends of vessel 514. Partition 570 includes an upper portion 570A situated intermediate tube legs 560 and the circumferential wall of vessel 514 and having its upper end spaced from the corresponding end of vessel 514; and a lower portion 570B positioned between tube legs 558 and 560 and having its lower end connected to plate 516 and its opposite end connected to portion 570A by a horizontal annular plate 570C. So partition 564 cooperates with vessel 510 to form a flow passageway 566 and with partition 570 to provide flow passage 572; while partition 570 combines with the circumferential wall of vessel 514 to provide flow passages 573 and 574. Flow passage 574 is further subdivided by horizontal annular partitions 575 alternately extending from the inner face of vessel 514 and partition portion 570B to effect winding flow of fluid in passage 574 and over tube legs 560 disposed therein. Vessel 514 is supplied with secondary fluid from a conduit 577 extending into the upper end of passage 566 and connected to a ring-shaped fluid distribution header 578.

Pumps 582 are positioned outside and adjacent to vessel 514, each pump having an inlet conduit 584 connected to vessel 514 and opening to compartment 524 and an outlet conduit 586 connected to vessel 510 and opening to flow space 542. Space 542 is formed by vessel 510 and upright cylindrical shell 536, which surrounds shroud 528 and its extension in the same manner as its counterpart in FIG. 2 and has its upper end connected to vessel 510 at about the level of the bottom of vessel 514. Vessel 510 is formed with openings 590 to allow flow of primary coolant from shell 536 to compartment 522. Tandem gate valves 594 of the character described in the FIG. 2 embodiment are provided to control fluid flow through passages 590 and 586.

In operation primary fluid is cycled from core 526 through tubes 556, pumps 582 and passage 542 back to core 526; while secondary fluid courses its way through passages 566, 572, 573 and 574 and over tubes 556 to outlet nozzles 562.

The construction and arrangement of the elements of the FIG. 6 embodiment are generally the same as those of FIG. 5 except for the internals of the tube-containing pressure vessel. In FIG. 6 vessel 614 is divided by upper and lower annular plates 616 into compartments or chambers 618, 622 and 624, with compartment 618 being occupied by straight vertical tubes 656 having their opposite ends fitted into openings in plates 616. Compartment 618 is provided with an upright annular partition 664 intermediate tubes 656 and the circumferential wall of vessel 614 and having its opposite ends spaced from the corresponding ends of compartment 618. The space occupied by the upper portion of tube bank 656 is partitioned by alternately arranged horizontal doughnut and disc shaped baffles 668 and 670, respectively, of the type disclosed in U.S. application S.N. 426,035 to provide sinuous flow of secondary fluid, with lowermost baffle 668 having its outer edge connected to the adjacent circumferential walls of vessels 610 and 614. Thus partition 664 cooperates with the circumferential wall of vessel 614 and lowermost baffle 668 to provide annular flow passages 666 and 674; and with the circumferential wall of vessel 610 to provide flow passage 672. The circumferential wall of vessel 614 is provided with a nozzle 662 opening into passage 674 and with a nozzle 676 extending into the upper end of passageway 666 and connected to a fluid distribution header 678. Above header 678 baffle 664 is formed with openings 680.

Circulating pumps 682 are mounted alongside vessel 614, each pump having an inlet conduit 684 connected to compartment 624 and an outlet conduit 686 connected to vessel 610 and opening to flow passage 642. Vessel 610 is formed with openings 690 to permit flow of reactor coolant to compartment 622, with gate valves 694 providing control of flow through such openings. Primary fluid inlet compartment 622 is divided into sections by baffles in the same manner described in the FIG. 2 embodiment.

In operation reactor coolant is recirculated from core 626, through extension 634, of tubes 656, pumps 682 and passage 642 back to core 626; while secondary fluid, supplied through nozzle 676, passes over tubes 656 to outlet nozzle 662.

While in accordance with the provisions of the statutes, we have illustrated and described herein a specific form of the invention now known to us, those skilled in the art will understand that changes may be made in the form of the apparatus disclosed without departing from the spirit of the invention covered by our claims, and that certain features of the invention may sometimes be used to advantage without a corresponding use of the other features.

What is claimed is:

1. An integral vapor generator and nuclear reactor combination, which comprises a vertically extending inner pressure vessel, a nuclear reactor core contained within said inner pressure vessel and operable to generate heat, a vertically extending outer pressure vessel disposed in laterally surrounding spaced-apart relation to said inner pressure vessel to define therewith an annular vapor generation chamber, a pump for circulating a primary fluid and having an inlet, and an outlet disposed for communication with said inner pressure vessel to introduce therein primary fluid for flow through said core to extract heat therefrom, a plurality of heat exchanger tubes extending within said vapor generation chamber for conveying therethrough primary fluid heated by said core, each tube having an inlet end disposed for communication with said inner pressure vessel to receive therefrom heated primary fluid, and an outlet disposed for communication with the inlet of said pump to return thereto for recirculation thereby primary fluid conveyed in the tube through said vapor generation chamber, an inlet means communicating with said vapor generation chamber to deliver thereto a secondary liquid to be vaporized by heat transferred through said tubes from the primary fluid flowing therein, and an outlet means communicating with said chamber to deliver therefrom vapors thus generated from such secondary liquid.

2. The integral vapor generator and nuclear reactor combination according to claim 1 including tube sheet means receiving the inlet and outlet ends of said heat exchanger tubes, means defining a first plenum chamber communicating with the inlet ends of said tubes and communicating with said inner pressure vessel to accommodate flow of primary fluid therefrom into the inlet ends of said tubes, and means defining a second plenum chamber communicating with the outlet ends of said tubes and communicating with the inlet of said pump to accommodate flow of primary fluid from the outlet ends of said tubes to said pump inlet.

3. The integral vapor generator and nuclear reactor combination according to claim 1 wherein said inner and outer pressure vessels are generally upright, and including an upright baffle means disposed within said inner pressure vessel in laterally surrounding relation to said core to direct the primary fluid introduced into said inner pressure vessel to flow from the lower end of said core upwardly past the core.

4. The integral vapor generator and nuclear reactor combination according to claim 2 wherein said pump has an inlet conduit communicating with said second plenum chamber and an outlet conduit communicating with said first plenum chamber, and said inlet conduit is concentrically disposed about said outlet conduit.

5. The integral vapor generator and nuclear reactor combination according to claim 2 including baffle means disposed within said vapor generation chamber to establish a sinuous flow path for secondary liquid introduced therein.

6. The integral vapor generator and nuclear reactor combination according to claim 5 wherein said inner and outer pressure vessels are cylindrical, and including means disposed within said vaporization chamber for mixing a portion of the vapor generated therein with inflowing secondary liquid to preheat same.

7. The integral vapor generator and nuclear reactor combination according to claim 2 wherein the reactor core is located in the lower portion of said inner pressure vessel, and including fluid pressurizer means located in the upper portion of said inner pressure vessel and operable to establish a predetermined primary fluid pressure therein.

8. The integral vapor generator and nuclear reactor combination according to claim 2 wherein said tube sheet means is a single tube sheet and said heat exchanger tubes are U-shaped.

9. The integral vapor generator and nuclear reactor combination according to claim 2 wherein said tube sheet means includes a pair of separated tube sheets, and said heat exchanger tubes are generally straight, with the inlet ends of said tubes being received in one tube sheet, and the outlet ends of said tubes being received in the other tube sheet.

10. The integral vapor generator and nuclear reactor combination according to claim 2 including means subdividing said first and second plenum chambers each into a plurality of compartments, with corresponding first and second plenum chamber compartments being disposed for communication respectively with the inlet and outlet ends of the same tubes in a corresponding group thereof, and valve means disposed to control the flow of primary fluid to each of said compartments.

11. The integral vapor generator and nuclear reactor combination according to claim 2 including a vapor-liquid separating drum disposed outside said outer pressure vessel and connected thereto for communication therewith to receive a vapor-liquid mixture therefrom and to return thereto liquid separated from such mixture.

12. The integral vapor generator and nuclear reactor combination according to claim 11 including means for spraying secondary liquid into said drum.

References Cited

UNITED STATES PATENTS

| | | | |
|---|---|---|---|
| 3,012,547 | 12/1961 | Ostergaard et al. | 122—32 |
| 3,147,743 | 9/1964 | Romandos | 122—32 |
| 3,150,051 | 9/1964 | Ammon | 176—53 |
| 3,151,034 | 9/1964 | Douglass et al. | 176—53 |
| 3,213,833 | 10/1965 | Cunningham et al. | 122—34 |
| 3,255,088 | 6/1966 | Sprague et al. | 176—53 |
| 3,267,906 | 8/1966 | Deighton | 176—53 |

FOREIGN PATENTS

| | | |
|---|---|---|
| 800,385 | 8/1958 | Great Britain. |
| 835,266 | 5/1960 | Great Britain. |

L. DEWAYNE RUTLEDGE, *Primary Examiner.*